US007604092B2

(12) United States Patent
Fritz

(10) Patent No.: US 7,604,092 B2
(45) Date of Patent: Oct. 20, 2009

(54) EXHAUST SYSTEM

(75) Inventor: Andreas Fritz, Ötisheim (DE)

(73) Assignee: Dr. Ing. h.c. F. Porsche Aktiengesellschaft, Weissach (DE)

( * ) Notice: Subject to any disclaimer, the term of this patent is extended or adjusted under 35 U.S.C. 154(b) by 132 days.

(21) Appl. No.: 11/800,511

(22) Filed: May 4, 2007

(65) Prior Publication Data

US 2008/0093160 A1   Apr. 24, 2008

(30) Foreign Application Priority Data

May 4, 2006   (DE)   .................... 10 2006 020 628

(51) Int. Cl.
*F01N 7/08* (2006.01)
(52) U.S. Cl. .................. 181/227; 181/212; 180/296
(58) Field of Classification Search ............. 181/296, 181/227, 228; 138/110, 112, 113, 148; D12/194
See application file for complete search history.

(56) References Cited

U.S. PATENT DOCUMENTS

| 2,841,232 | A | * | 7/1958 | Loeffler | 180/89.2 |
|---|---|---|---|---|---|
| 2,841,348 | A | * | 7/1958 | Stahlhuth | 248/65 |
| 2,850,314 | A | * | 9/1958 | Haigh et al. | 293/113 |
| 2,992,035 | A | * | 7/1961 | Tell et al. | 293/113 |
| 4,323,139 | A | * | 4/1982 | Baldwin | 181/263 |
| 5,100,047 | A | * | 3/1992 | Nakagawa et al. | 228/176 |
| 5,466,900 | A | * | 11/1995 | Knapp | 181/227 |
| 6,438,949 | B1 | * | 8/2002 | Nozaki | 60/322 |
| D467,210 | S | * | 12/2002 | Yu | D12/194 |
| D468,673 | S | * | 1/2003 | Horowitz | D12/194 |
| 6,595,318 | B2 | * | 7/2003 | Ebinger et al. | 181/227 |
| 6,962,230 | B2 | * | 11/2005 | Hanaya et al. | 180/309 |
| 7,007,720 | B1 | * | 3/2006 | Chase et al. | 138/110 |
| 7,032,702 | B2 | * | 4/2006 | Rinklin | 180/309 |
| D523,796 | S | * | 6/2006 | Marques et al. | D12/194 |
| 7,086,224 | B1 | * | 8/2006 | Perry | 60/319 |
| D534,111 | S | * | 12/2006 | Wannamaker | D12/194 |
| D539,716 | S | * | 4/2007 | Kulla | D12/194 |
| D558,657 | S | * | 1/2008 | Davidson | D12/194 |
| D559,753 | S | * | 1/2008 | Pfeiffer | D12/194 |
| 7,325,652 | B2 | * | 2/2008 | Huff et al. | 181/246 |
| D574,309 | S | * | 8/2008 | Unfried et al. | D12/194 |
| D579,841 | S | * | 11/2008 | Wagner | D12/194 |
| 2002/0053483 | A1 | * | 5/2002 | Ebinger et al. | 181/227 |
| 2002/0079162 | A1 | * | 6/2002 | Huff et al. | 181/282 |
| 2003/0137147 | A1 | * | 7/2003 | Girot et al. | 285/47 |
| 2003/0231506 | A1 | * | 12/2003 | Chen | 362/487 |
| 2004/0206573 | A1 | * | 10/2004 | Hsu | 181/228 |
| 2005/0023076 | A1 | * | 2/2005 | Huff et al. | 181/246 |
| 2005/0056482 | A1 | * | 3/2005 | Tsai | 181/227 |

(Continued)

FOREIGN PATENT DOCUMENTS

DE   199 40 102 A1   3/2001

(Continued)

*Primary Examiner*—Jeffrey Donels
*Assistant Examiner*—Forrest M Phillips

(57) ABSTRACT

In an exhaust system of a motor vehicle, a tailpipe cover is disposed on the exhaust pipe and protrudes through a cutout in the vehicle rear part with a defined gap clearance. In a hot condition, where a length of the exhaust system is increased due to thermal expansion, a greater clearance arises between the edge of the cutout and the tailpipe cover than in the cold condition. The tailpipe cover is trumpet cone shaped.

12 Claims, 1 Drawing Sheet

U.S. PATENT DOCUMENTS

2005/0056483 A1* 3/2005 Tsai .......................... 181/227
2005/0247516 A1* 11/2005 Uegane ..................... 181/228
2007/0240932 A1* 10/2007 Van De Flier et al. ....... 181/228
2008/0093160 A1* 4/2008 Fritz ......................... 181/227

FOREIGN PATENT DOCUMENTS

| DE | 101 36 350 A1 | 2/2003 |
| EP | 1 582 713 A1 | 10/2005 |
| JP | 03096434 | 4/1991 |

* cited by examiner

EXHAUST SYSTEM

CROSS-REFERENCE TO RELATED APPLICATION

This application claims the priority, under 35 U.S.C. § 119, of German application DE 10 2006 020 628.2-13, filed May 4, 2006; the prior application is herewith incorporated by reference in its entirety.

BACKGROUND OF THE INVENTION

Field of the Invention

The invention relates to an exhaust system with an exhaust tailpipe and a tailpipe cover connected to the latter. The tailpipe cover is disposed such that it protrudes through a cutout in a vehicle rear part and is connected thereto.

Tailpipe covers for exhaust systems are fastened in a known manner to the tailpipe of the exhaust system and are guided through a cutout, which runs all around, of a vehicle rear part and end with the latter. Due to relatively severe intrinsic movements of the exhaust system relative to the vehicle rear part and a thermal effect on the vehicle rear part, an encircling gap, which satisfies those conditions, is required with respect to the cutout. The gap is of relatively large design and equally covers all of the tolerances arising from the manufacturing, installation and the possible oscillatory movements of the exhaust system or of the exhaust tailpipe, and the thermal expansions which occur.

SUMMARY OF THE INVENTION

It is accordingly an object of the invention to provide an exhaust system, which overcomes the above-mentioned disadvantages of the heretofore-known devices and methods of this general type and which provides for an exhaust system with a tailpipe cover which, firstly, is arranged with a minimum gap clearance in a cutout of a vehicle rear part and, secondly, in the driving state ensures a gap clearance, which is sufficient for the thermal effects, for the tailpipe cover.

With the foregoing and other objects in view there is provided, in accordance with the invention, an exhaust system, comprising:
a tailpipe;
a tailpipe cover connected to said tailpipe and protruding through a cutout formed in a vehicle rear part and enclosing said tailpipe cover completely;
said tailpipe cover having a trumpet shape with a first section of a relatively smaller diameter and an end-side second section adjoining said first section and having a relatively larger diameter;
wherein, in a cold condition of the exhaust system, said second section of said tailpipe cover is disposed in a cold position defining a relatively smaller gap clearance with respect to the cutout and, in a hot condition of the exhaust system, said second section is disposed in a hot position defining a relatively larger gap clearance between said tailpipe cover and the cutout, and said gap clearance is temporarily increased in the hot position due to thermal increase in length of the exhaust system.

The advantages primarily obtained by the invention consist in that in the cold state of the exhaust system, the gap clearance for the tailpipe cover in the cutout of the vehicle rear part takes the oscillatory movements and tolerances arising from the manufacturing and installation into consideration. In particular, in the cold position of the exhaust system, the gap clearance is to be of relatively small design but, in a hot position, a larger gap clearance between a part of the tailpipe cover and the cutout is to be produced such that the thermal effect on the bodywork components is reduced.

This is achieved according to the invention by the tailpipe cover being of trumpet-shaped design with a first section of small diameter and an adjoining, end, second section of larger diameter. In a cold position of the exhaust system, the second section has a basic position with a gap clearance with respect to the cutout, which runs all around, that is smaller than the gap clearance between the tailpipe cover and the cutout, which gap clearance is temporarily changeable in a hot position upon a thermal increase in length of the exhaust system. By means of thermal effects on the exhaust system in the driving mode of the motor vehicle, the tailpipe cover can move out of the vehicle rear part counter to the direction of travel, which results in an increase in size of the gap and results in an air throughput through the gap with a cooling effect.

In particular, it is provided according to the invention that the first section of the tailpipe cover, which section is arranged upstream of the exhaust gas flow, is matched to the diameter of the exhaust pipe of the exhaust system and is connected to said exhaust pipe, with the adjoining section being connectable to the first section of the tailpipe cover via a convexly curved transition region. This advantageously results in an air guidance passage with a larger gap than in the cold position of the exhaust system. In the cold position of the exhaust system, the tailpipe cover has a small gap clearance which is assigned to a basic position, in the cutout of the vehicle rear part and, in the hot position the tailpipe cover has a larger gap clearance in an end position.

By means of the larger gap clearance in the cutout of the vehicle rear part between the transition region of the two sections of the tailpipe cover in addition to a sufficient clearance zone for oscillatory movements in the driving mode, the thermal effects on the vehicle rear part are also reduced, that is to say, because of the gap-induced maximum air throughput, the vehicle rear part is not additionally loaded by the heat radiating from the exhaust system.

Other features which are considered as characteristic for the invention are set forth in the appended claims.

Although the invention is illustrated and described herein as embodied in an exhaust system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
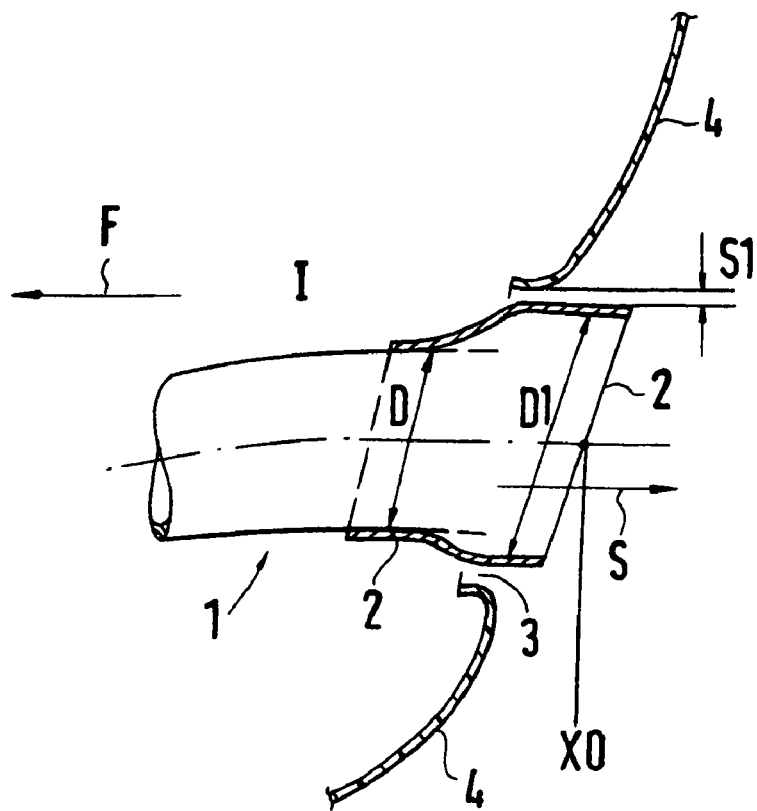
FIG. 1 is a schematic illustration of the exhaust system with tailpipe cover in its cold condition.

Referring now to the figures of the drawing in detail and first, particularly, to FIG. 1 thereof, a tailpipe cover 2 is held on an exhaust pipe 1 of an exhaust system. The tailpipe cover 2 projects through a cutout 3 in a vehicle rear part 4, such as a rear skirt. The cutout is formed to encircle the tailpipe cover.

The exhaust tailpipe 2 is arranged in the cutout 3 with a gap clearance S1 or S2. The gap clearance S1 is defined when the exhaust system is cold (i.e., the cold position I) and the gap clearance S2 is defined when the exhaust system is hot (i.e., the hot position II) during operation. The "cold condition" of the exhaust system is defined as a normal, exterior temperature range wherein the exhaust system is substantially in a thermally non-expanded, repose condition. The "hot condition" of the exhaust system is defined in a temperature range that is encountered when the motor vehicle is warmed up and operating at elevated operating temperature.

Figure 2:
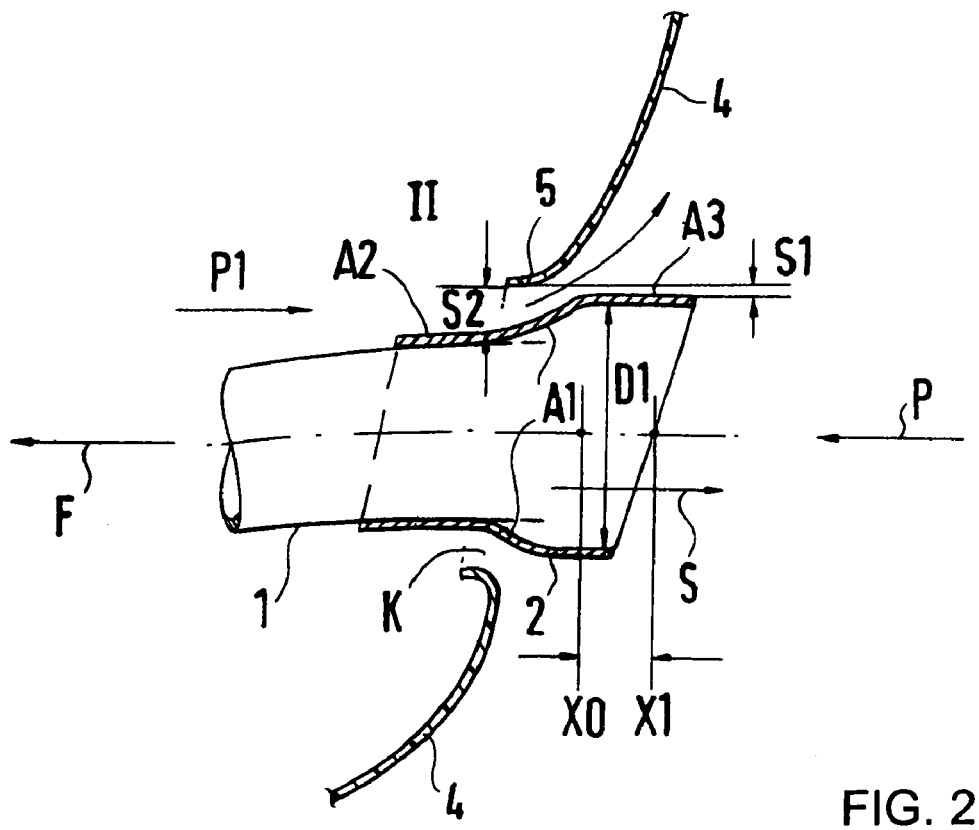
FIG. 2 shows a schematic illustration of the exhaust system with tailpipe cover in its hot condition during a driving mode.

When looking directly in the arrow direction P from the rear at the tailpipe cover 2, only the gap S1 is apparent, whether in the cold position I (FIG. 1) or in the hot position II (FIG. 2).

Upon thermal heating of the exhaust system, the tailpipe cover 2 emerges continuously from the vehicle rear part 4, to be precise from the position X0 (cold position I) into the position X1 (hot position II). Upon the thermal increase in length from X0 to X1 (FIG. 2), a transition region A1 between a first section A2 on the exhaust pipe 1 and an adjoining second section A3, situated outside the vehicle rear part 4, is directed toward a boundary edge 5 of the vehicle rear part. The gap S2, which is arranged all around, in the cutout 3 is formed between the edge 5, which runs all around, and the transition region A1, and said gap S2 is substantially larger than the gap S1, as a result of which a maximum air throughput is possible in the arrow direction P1 such that the vehicle rear part 4, which is composed of plastic, essentially does not experience any substantial thermal loading due to radiation of heat or conduction of heat.

The air guiding passage K formed by the gap S2 is formed by the transition region A1, on the one hand, and the edge 5 on the other hand. The transition region A1 is rounded in a concave curve, and the edge 5 is drawn inward and formed in a convex curve.

The invention claimed is:

1. An exhaust system, comprising:
   a tailpipe;
   a tailpipe cover connected to said tailpipe and protruding through a cutout formed in a vehicle rear part and enclosing said tailpipe cover completely;
   said tailpipe cover having a trumpet shape with a first section of a relatively smaller diameter and an end-side second section adjoining said first section and having a relatively larger diameter, said first section having the relatively smaller diameter disposed upstream along an exhaust gas flow and is matched to and connected to said tailpipe, and an adjoining, convexly curved transition region is disposed between said first section and said second section of said tailpipe cover; and
   wherein, in a cold condition of the exhaust system, said second section of said tailpipe cover is disposed in a cold position defining a relatively smaller gap clearance with respect to the cutout and, in a hot condition of the exhaust system, said second section is disposed in a hot position defining a relatively larger gap clearance between said tailpipe cover and the cutout, and said gap clearance is temporarily increased in the hot position due to thermal increase in length of the exhaust system.

2. The exhaust system according to claim 1, wherein, in the cold position of the exhaust system, the smaller gap clearance is formed between the cutout in the vehicle rear part and said second section of said tailpipe cover.

3. The exhaust system according to claim 1, wherein, in the hot position of the exhaust system, the larger gap clearance is formed between the cutout in the vehicle rear part and said convexly curved transition region between said first section and said second section of said tailpipe cover.

4. The exhaust system according to claim 1, wherein said first and second sections of said tailpipe cover are connected to one another through said convexly curved transition region and said convexly curved transition region, together with an inwardly drawn-in edge of the cutout, defining an air throughflow passage having the relatively larger gap clearance.

5. The exhaust system according to claim 1, wherein, in the cold position, said tailpipe cover has a gap clearance, relative the cutout in the vehicle rear part, associated with a basic position and, in the hot position, said tailpipe cover has a gap clearance, relative the cutout, associated with an end position.

6. The exhaust system according to claim 1, wherein said first and second sections are connected through said convexly curved transition region formed as a uniform transition cone.

7. A vehicle, comprising:
   a vehicle rear part having a rear region being drawn inward and of a convexly curved configuration and having a cutout formed therein; and
   an exhaust system, containing:
   a tailpipe;
   a tailpipe cover connected to said tailpipe and protruding through said cutout formed in said vehicle rear part and enclosing said tailpipe cover completely;
   said tailpipe cover having a trumpet shape with a first section of a relatively smaller diameter and an end-side second section adjoining said first section and having a relatively larger diameter, said first section having the relatively smaller diameter is disposed upstream along an exhaust gas flow and being matched to and connected to said exhaust pipe, and an adjoining, convexly curved transition region is disposed between said first section and said second section of said tailpipe cover, said convexly curved transition region disposed adjacent said rear region of said vehicle rear part; and
   wherein, in a cold condition of said exhaust system, said second section of said tailpipe cover is disposed in a cold position defining a relatively smaller gap clearance with respect to the cutout and, in a hot condition of the exhaust system, said second section is disposed in a hot position defining a relatively larger gap clearance between said tailpipe cover and the cutout, and said gap clearance is temporarily increased in the hot position due to a thermal increase in a length of said exhaust system.

8. The vehicle according to claim 7, wherein, in the cold position of said exhaust system, the smaller gap clearance is formed between said cutout in said vehicle rear part and said second section of said tailpipe cover.

9. The vehicle according to claim 7, wherein, in the hot position of said exhaust system, the larger gap clearance is formed between said cutout in said vehicle rear part and said convexly curved transition region between said first section and said second section of said tailpipe cover.

10. The vehicle according to claim 7, wherein said first and second sections of said tailpipe cover are connected to one another through said convexly curved transition region and said convexly curved transition region, together with an inwardly drawn-in edge of said cutout, defining an air throughflow passage having the relatively larger gap clearance.

11. The vehicle according to claim 7, wherein, in the cold position, said tailpipe cover has a gap clearance, relative said cutout in said vehicle rear part, associated with a basic position and, in the hot position, said tailpipe cover has a gap clearance, relative said cutout, associated with an end position.

12. The vehicle according to claim 7, wherein said first and second sections are connected through said convexly curved transition region formed as a uniform transition cone.

* * * * *